United States Patent [19]
Paulk, Jr.

[11] Patent Number: 5,205,487
[45] Date of Patent: Apr. 27, 1993

[54] IRRIGATION CONTROL DEVICE

[76] Inventor: Raymond G. Paulk, Jr., 2311 Crooked La., Southlake, Tex. 76092

[21] Appl. No.: 844,170

[22] Filed: Mar. 2, 1992

[51] Int. Cl.⁵ .............................................. B67D 5/38
[52] U.S. Cl. ..................................... 239/74; 137/552; 137/883; 239/562; 239/565
[58] Field of Search ................... 239/71, 74, 562, 565, 239/76; 73/861.57, 861.56, 861.55; 137/552, 883, 561 A; 222/40

[56] References Cited

U.S. PATENT DOCUMENTS

| | | | |
|---|---|---|---|
| 3,691,835 | 9/1972 | Metzger | 73/861.55 |
| 3,712,134 | 1/1973 | Dettmer | 73/861.55 |
| 3,715,921 | 2/1973 | Grauer et al. | 73/861.55 |
| 3,842,671 | 10/1974 | Frizelle | 73/861.57 |
| 3,974,857 | 8/1976 | Hehl | 73/861.55 |
| 4,834,143 | 5/1989 | Bayat | 137/883 |

FOREIGN PATENT DOCUMENTS

3442359  5/1985  Fed. Rep. of Germany ........ 239/76

*Primary Examiner*—Andres Kashnikow
*Assistant Examiner*—Christopher G. Trainor
*Attorney, Agent, or Firm*—John J. Murphey

[57] ABSTRACT

An irrigation control device, comprising a primary water supply tube for operable connection to a pressurized water source, a plurality of water manifold pipes extending horizontally from the supply tube having formed along the tops thereof a plurality of apertures, a manifold seat for water-tight connection with each of the apertures and including an upwardly opening receptacle in flow communication with the supply tube, a plurality of rotameters arranged upright for receipt in the receptacles, each rotameter including a base through which is formed a passageway for receipt of a flow of water, a transparent water tube extending upright therefrom having formed therethrough a vertical passageway and a weighted element therein positionally responsive to the flow of water therethrough, and an outlet nozzle located above the valve for connection to a water line to convey the controlled flow of water to areas requiring irrigation and, a cabinet for housing the manifold pipes and the rotameters, including an access panel operably attached thereto.

9 Claims, 4 Drawing Sheets

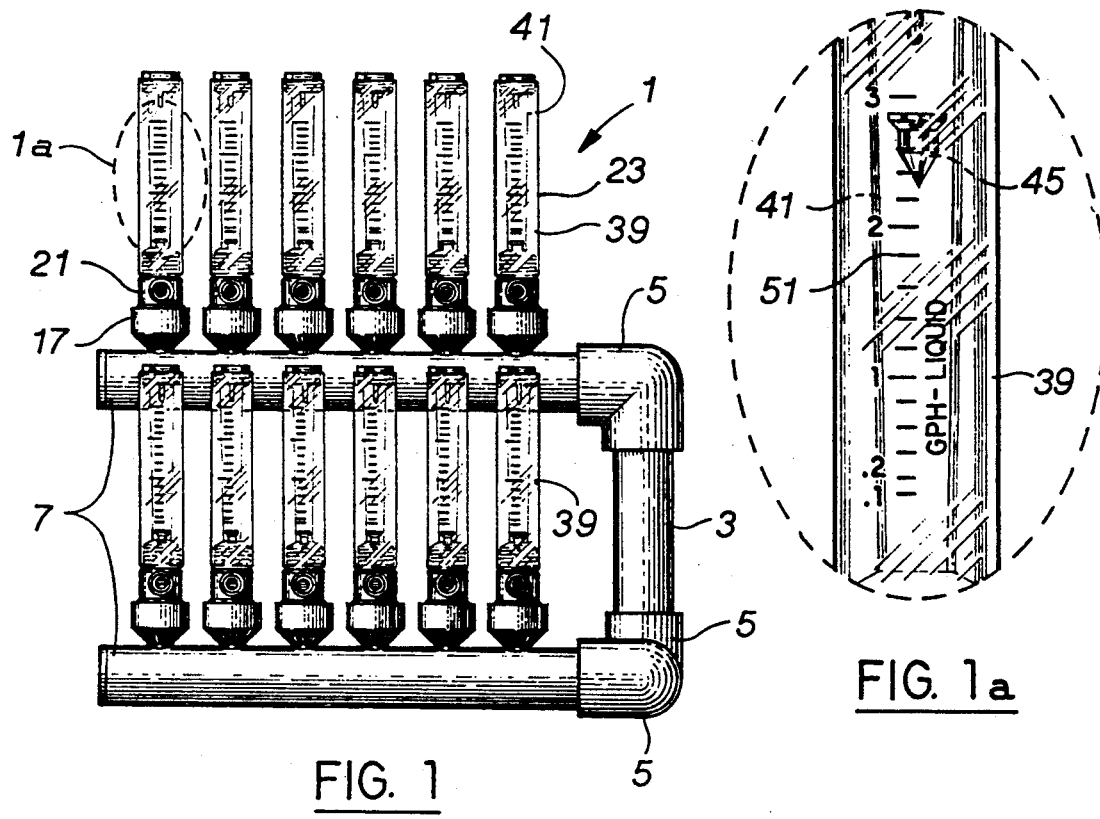
FIG. 1
FIG. 1a
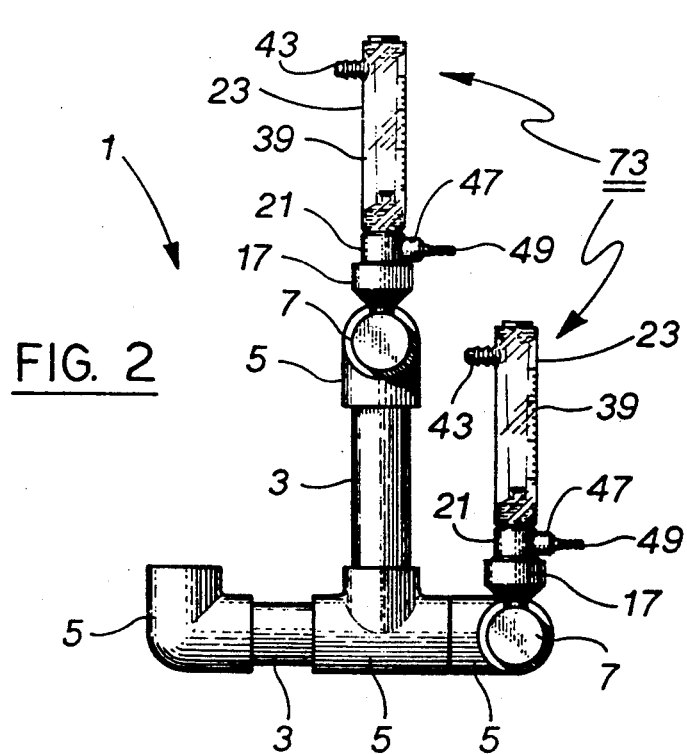
FIG. 2

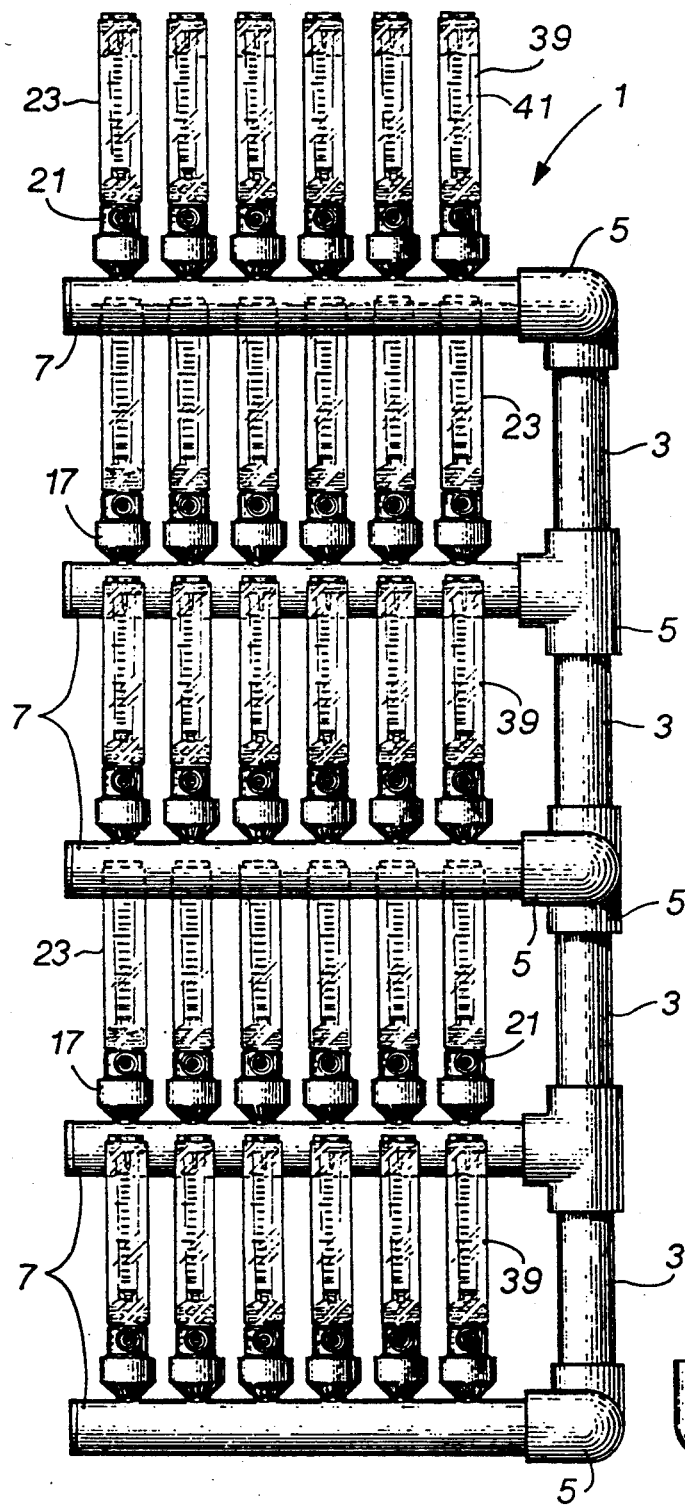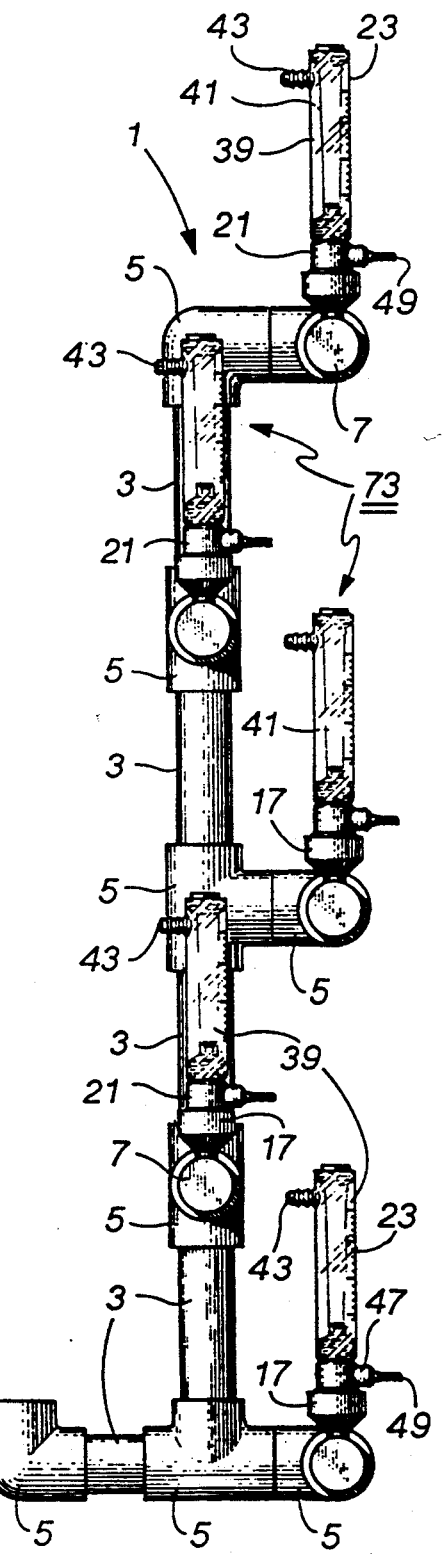
FIG 3
FIG 4

IRRIGATION CONTROL DEVICE

BACKGROUND OF THE INVENTION

1. Field of the Invention pertains to the field of distribution and control devices for irrigation. More specifically, it pertains to a unique device for accurately and safely controlling the flow of water needed to irrigate an area where close control of volumetric flow is desired.

2. Description of the Prior Art

The need to control the distribution of water for irrigation of broad land areas or areas of comprehensive floral involvement has been recognized for centuries. Too much water will flood and kill the plants whereas too little will stunt their growth or allow them to dry out and die. Plants exhibit a noticeable variation in required water and often this is not taken into account during irrigation resulting in maximizing the growth potential of some flora while maintaining other plant life in an inefficient and/or deteriorated condition.

Means such as channel networks with positionable weirs have been used to control gross flow of water. In other situations, water feed lines connected to spray nozzles are fitted with hand-operated valves of various designs and shapes to more closely control water flow and total usage. In certain parts of the country, namely the south and southwest, water resources have become strained because of the lack of rain and snow fall, and communities are opting for tighter irrigation controls. No acceptable, finely-tunable irrigation systems have yet been devised so that the only alternative appears to be irrigation moratoriums.

A total loss of irrigation in arid or semi-arid areas usually spells disaster for the flora of that region and often results in excessive difficulty in regenerating plant life upon normalization of water resource. Use of prior art irrigation control methods do not provide sufficient close and/or accurate distribution of water to result in significant savings and simultaneously insure that all crops are given sufficient water to survive. As water becomes more scarce, the individual requirement of each specie of plant becomes more important and any successful irrigation system mandates different minimum water distributions to individual plants. Even close control of water channels will not insure that each plant will not receive too much or too little water.

As an alternative to full termination of irrigation, it has been demonstrated that plants given small doses of water applied deep in their root section will thrive quite well. This plan maximizes the quality and quantity of plant life while reducing water requirements to extremely low values, or, in other words, a plan that achieves the best of both worlds. This alternative has not reached commercial practicality because there is no extant device that provides acceptable control under conditions where it is conveniently housed and easily operated. What is needed therefore, is a device that is sturdy, compact and easy to operate for providing overall control of water flow to an area of comprehensive or diverse plant life where the control closely matches the water consumption requirements of the specific plants.

SUMMARY OF THE INVENTION

This invention is an irrigation control device that either resolves the problems existing in the prior art or reduces them to manageable proportions. The invention comprises a series of closely packed rotameters operably housed and conveniently arranged in a small cabinet where individual control of water flows is easily and conveniently allowed. Individual rotameters are densely packed in manifolds interposed the gross water supply line and the individual lines directed to each floral pattern in the area to be irrigated. Finely-tuned water flows can be easily and readily provided to each specie of plant while total, overall consumption can be readily monitored. Specifically, where the device is used in conjunction with underground watering pipes of the "weeping" type, there results a highly restricted gross water flow yet adequate doses of water are provided to individual plants such that efficiency of growth of all the plant life is maximized at or near 100%.

The rotameters are uniquely condensed into a tightly-packed system. A novel mounting is attached to manifolds to allow removal or ready interchange of rotameters, should one need replaced for maintenance or removed as not needed. The invention further includes a special plug for temporary installation in the unique rotameter seat to reduce maintenance on the unit by a significant quantity. The device may be constructed almost entirely of plastic resulting in lower capitalization requirements, lower weight and less strain on existing water supply lines, as well as installation by a wider range of technicians and extended longevity due to the inertness of the plastic, itself.

Accordingly, the main object of this invention is an irrigation control device that provides close control of water distribution networks over a wide area. Other objects of the invention include a device utilizing rotameter control over flows to specific areas of floral involvement to allow the operator to significantly reduce water consumption in specific areas attuned to low water requirements; a device capable of providing fully controlled water flows over a wide variety and wide range of plant life; a device having largely reduced initial capitalization requirements, maintenance costs and easily handled by a wider-range, hence lower-cost, labor force; and, a device whose life cycle is greatly extended due to its resistance to environmental degradation.

These and other objects of the invention will become more clear upon reading the description of the preferred embodiment in conjunction with the drawings attached hereto. The scope of protection sought by the inventors may be gleaned from a fair reading of the claims which conclude this specification.

DESCRIPTION OF THE DRAWINGS

FIG. 1 is a front elevation view of a smaller version of the inventive irrigation control device of this invention;

FIG. 1a is an enlarged fragmentation view of indicia, etc., shown in FIG. 1;

FIG. 2 is a left side elevation view of the embodiment shown in FIG. 1;

FIG. 3 is a front elevation view of a larger irrigation control device of this invention;

FIG. 4 is a left side elevation view of the embodiment shown in FIG. 3;

DESCRIPTION OF THE PREFERRED EMBODIMENT

Figure 7:
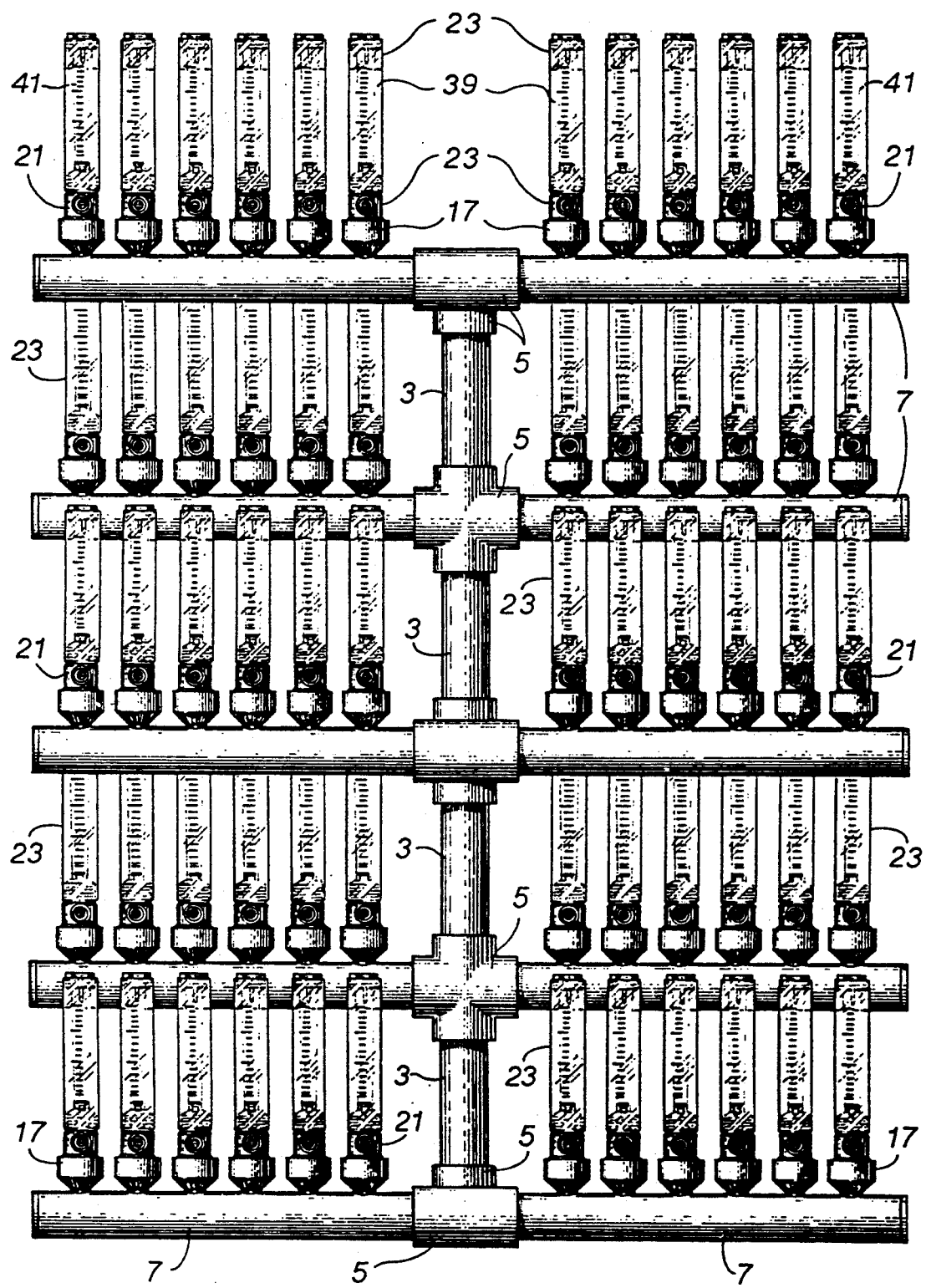
FIG. 7 is a front elevation view of a large, comprehensive irrigation control device of this invention; and, FIG. 8 is a front elevation view of the preferred embodiment of the invention with the cabinet door opened to show the interior thereof.

Referring now to the drawings wherein like elements are identified with like numerals throughout the nine figures, FIG. 1 shows the invention 1 to comprise a primary water supply tube 3 including a "T" fitting or elbow 5 for operable connection to a pressurized water source of the type commonly found extending from main water lines to various parcels of property or real estate needing irrigation. A plurality of water manifold pipes 7 are arranged to extend horizontally from supply tube 3 through interconnection to supply tube 3 by fittings such as elbows 5 or "Ts". A plurality of apertures 9 (see FIG. 5) are formed along the top surface of manifold pipe 7 preferably in closely spaced arrangement. Apertures 9 are preferably formed as circular holes of accurate dimensions and pass totally through the upper wall of manifold pipe 7 into the interior thereof.

Figure 5:
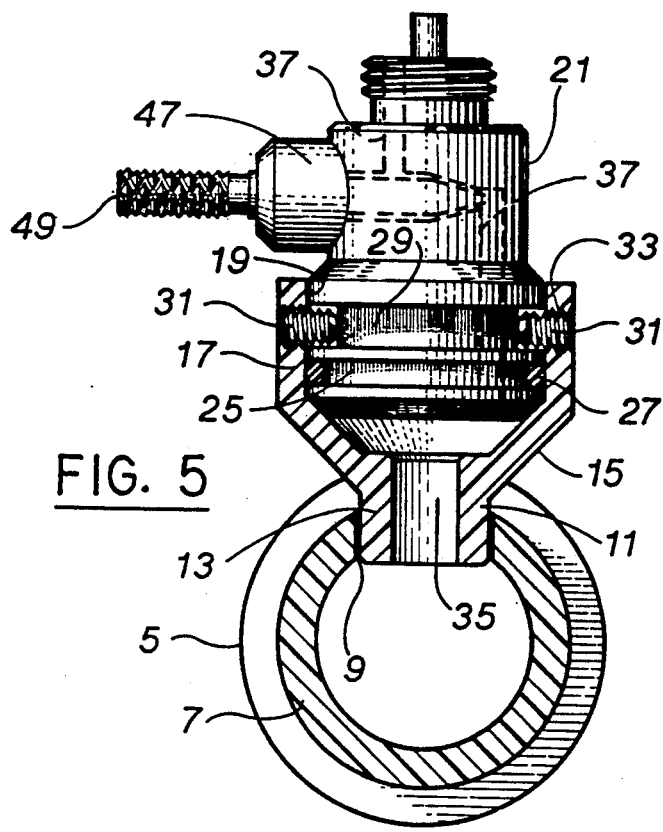
FIG. 5 is a side elevation, partly in section, view of the manifold seat design of this invention.

Individual manifold seats 11, preferably of the type shown in FIG. 5, are inserted in apertures 9 and fixably arranged therein in water-tight sealed connection. This connection may be of a threaded type with appropriate seals, gaskets or the like. However, it is preferred that seats 11 be merely glued therein in non-removable interconnection therewith using common plastic-to-plastic adhesives. Manifold seat 11 comprises a lower nozzle or boss 13 dimensioned to fit tightly in aperture 9, an intermediate flared portion 15 extending upwardly and outwardly from boss 13, and an upper rotameter seat portion 17 that opens upwardly therefrom. It is preferred that manifold seat portion 17 includes an inner-wall open area 19 having extremely accurate inner-diameter dimensions to receive base 21 of a rotameter 23 with close fitting accuracy.

A first circumferential channel 25 is formed in the lower portion of rotameter base 21 for receipt of an O-ring 27 to form a water-tight seal between manifold seat inner-wall 19 and rotameter base 21 to prevent the leakage of water therethrough. A second channel 29 is formed circumferentially in rotameter base 21 and spaced apart from first channel 25. Channel 29 is adapted to match up with at least one, but preferably a pair of, set screws 31 threadably received on opposite sides of rotameter seat portion in apertures 33 formed through the wall thereof. Rotameter 23 may therefore be quickly and easily inserted in manifold seat portion 17 and set screws 31 advanced inward to lock rotameter 23 therein in water-tight connection along with O-ring 27.

A first passageway 35 is formed centrally through boss 13 opening into manifold seat portion 17 through flared portion 15 to allow water to flow from the interior of manifold pipe 7 into rotameter 23 through a second passageway 37 formed upwardly through rotameter base 21 as shown in FIG. 5.

Rotameter 23 comprises a water tube 39 attached to rotameter base 21 through which is centrally formed a vertical passageway 41 of gradually increasing diameter for passage of water from manifold pipe 7 through seat 11 and base 21 upwardly towards and out an exit nozzle 43 for connection to a second water line for carrying the flow of water to the plants or their roots. A moveable weighted element 45 (called a "float" although it is heavier than water) usually of a conical or other hydrodynamic design, is placed in passageway 41 and adapted to be supported or held stationary by the upwardly flowing water through passageway 41. In the absence of flow, element 45 sinks to the bottom of passageway 41. A valve 47 located in rotameter base 21 interconnects passageway 37 with passageway 41 and is operable through a valve stem 49 to allow various flow rates of water to pass upwards through rotameter 23. A series of indicia 51 are printed or formed on the surface of water tube 39 and generally contain horizontal markings indicating various rates of flow such as in gallons per hour or gallons per minute. Water flow through rotameter 23 is closely controlled by manipulating valve 47 to achieve a desired rate of water flow indicated by element 45 rising in passageway 41 to indicate the desired flow rate vis-a-vis indicia 51.

Invention 1 further comprises a plurality of rotameters 23, as shown in FIGS. 1, 3 and 7 to be tightly packed by close spacing along the tops of water manifold pipes 7 and turned in a common direction for viewing by the operator. Exit nozzle 43 is connected to a distribution line, generally by virtue of flexible plastic tubes that are directed underground to either "weep" pipes or other water distribution means to transfer the accurate flows of water to root masses on which the plants are supported.

Figure 6:
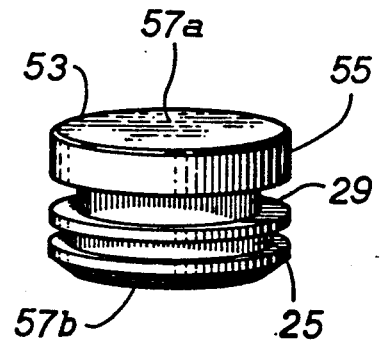
FIG. 6 is a trimetric view of a plug that fits into the manifold seat shown in FIG. 5.

Referring now to FIG. 6, a plug 53 is shown comprising a smooth cylindrical outer wall 55 terminated by transverse top and bottom walls 57a and 57b respectively. The outer diameter of plug 53 is preferably set at the same outer diameter of rotameter base 21. When a rotameter is to be removed for servicing or because it is no longer desired in the particular irrigation plan, plug 53 is inserted in manifold seat portion 17 and set screws 31 tightened thereagainst to insure that water does not leak from first passageway 35 to the outside.

Figure 8:
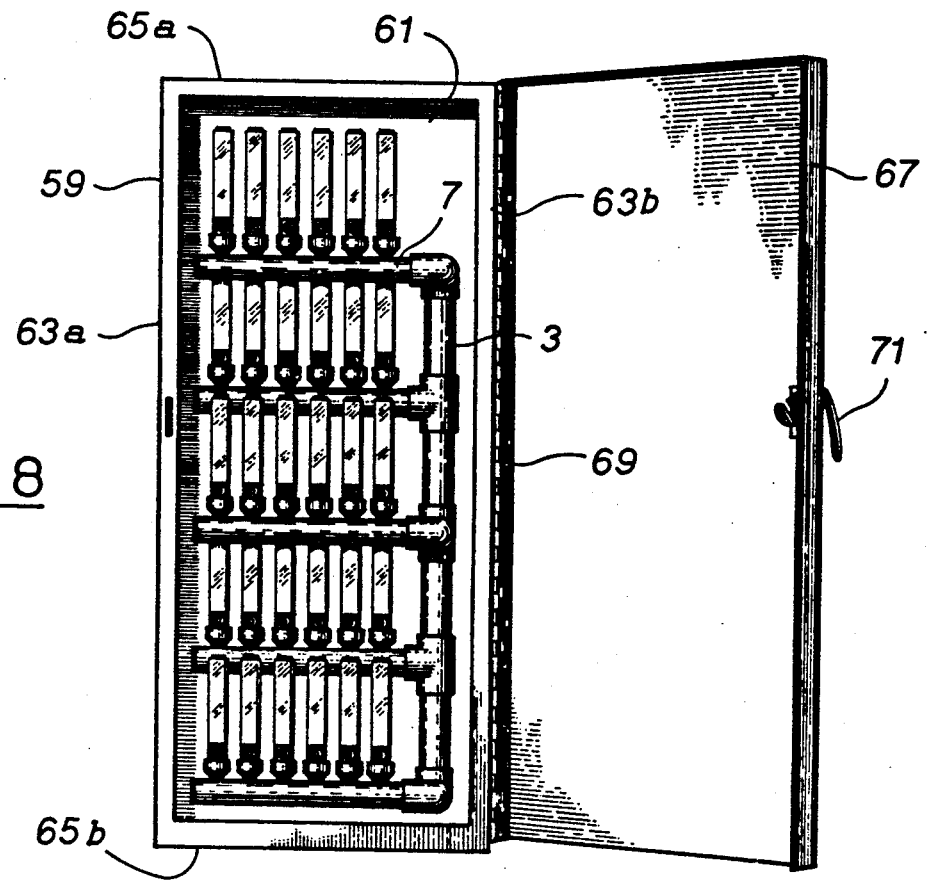

As shown in FIG. 8, a cabinet 59 is provided for housing supply tubes 3, water manifold pipes 7, and rotameters 23 in a convenient yet usable arrangement. Cabinet 59 comprises a back wall 61 of a size to cover all of the aforesaid elements, bounded along its terminal edges by side walls 63a and 63b and top and bottom walls 65a and 65b respectively and closed over by an access panel 67 rendered openable through hinges 69 and panel catch 71 as shown. Cabinet 59 may be formed in a wide range of sizes and shapes and mounted in a wide variety of locations ranging from a work shed, for field operations, to a garage, carport or basement for operations near or adjacent residential buildings.

Means 73 is provided as shown in FIGS. 2 and 4 to offset one row of rotameters 23 from another to compact the rotameters and accompanying water manifold pipes into a closely packed yet easily accessible unit Means 73 is shown in FIGS. 2 and 4 to comprise a plurality of pipe Ts, elbows and spiders for interconnection between water supply tube 3 and manifold pipes 7 to offset one row of rotameters from another as shown more clearly in FIGS. 2 and 4.

While the invention has been described with reference to a particular embodiment hereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. An irrigation control device, comprising:
   a) a primary water supply tube for operable connection to a pressurized water source;
   b) a plurality of water manifold pipes extending horizontally from said supply tube having formed along the tops thereof a plurality of apertures;
   c) a manifold seat for water-tight connection with each of said apertures and including an upwardly opening receptacle in flow communication with said supply tube;
   d) a plurality of rotameters arranged upright for receipt in said receptacles, each rotameter including a base throughwhich is formed a passageway for receipt of a flow of water, a transparent water tube extending upright therefrom having formed therethrough a vertical passageway and a weighted element therein positionally responsive to the flow of water therethrough, and a water outlet located above said valve for connection to a water line to convey the controlled flow of water to areas requiring irrigation; and,
   e) a cabinet for housing said manifold pipes and said rotameters, including an access panel operably attached thereto.

2. The irrigation control device of claim 1 wherein said upwardly opening receptacle includes a circular open area formed therein adapted to receive the bottom of said rotameter such that said passageway opens into said manifold pipe and further including means for preventing leakage of water therefrom.

3. The irrigation control device of claim 1 further including a plug of a size and shape adapted to fit tightly in said receptacle when one of said rotameters is removed therefrom.

4. The irrigation control device of claim 1 further including means to offset each manifold pipe carrying rotameters from each other to compact them.

5. The irrigation control device of claim 4 wherein said means to offset said rotameters includes a plurality of pipe Ts, elbows and stubs interconnected and interposed between water supply tube and said water manifold pipes to reduce the space between said banks of rotameters and the overall size of the device.

6. The irrigation control device of claim 1 wherein said water outlet on said rotameter is adapted to attach to a small diameter flexible tube to convey water to a particular plant or group of plants.

7. The irrigation control device of claim 1 wherein said rotameters are arranged mutually parallel to each other on said manifold pipes.

8. The irrigation control device of claim 1 wherein said manifold seat comprises a boss for inserting in said manifold pipes in water-tight interconnection therewith, a flare portion opening outwardly and upwardly from said boss and a rotameter seat portion extending upwardly from said flared portion and having formed in said seat portion at least one aperture for threadable receipt of a set screw, said set screw arranged to mate in alignment with a channel circumferentially formed about the base of said rotameter and to receive said set screw to hold said rotameter securely in said manifold seat.

9. The device of claim 8 further including a second and lower channel formed in said base of said rotameter seat portion of said manifold seat for receipt of an O-ring in sealing engagement therebetween.

* * * * *